United States Patent
Von Rymon Lipinski et al.

(10) Patent No.: US 9,284,230 B2
(45) Date of Patent: Mar. 15, 2016

(54) METHOD FOR PRODUCING LIGHT CERAMIC MATERIALS

(75) Inventors: Tadeusz Von Rymon Lipinski, Bonn (DE); Bruno Keller, Wackernheim (DE); Frank Beissmann, Babenhausen (DE); Peter Neugebauer, Limburg (DE); Ruth Kernke, Darmstadt (DE); Dirk Poppe, Frankfurt am Main (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 14/239,489

(22) PCT Filed: Aug. 23, 2012

(86) PCT No.: PCT/EP2012/066437
§ 371 (c)(1),
(2), (4) Date: Feb. 18, 2014

(87) PCT Pub. No.: WO2013/041322
PCT Pub. Date: Mar. 28, 2013

(65) Prior Publication Data
US 2014/0228211 A1   Aug. 14, 2014

(30) Foreign Application Priority Data
Sep. 20, 2011 (DE) .................. 10 2011 113 696

(51) Int. Cl.
*C04B 38/06*   (2006.01)
*C04B 35/634*   (2006.01)
(Continued)

(52) U.S. Cl.
CPC ............. *C04B 38/0695* (2013.01); *C04B 33/00* (2013.01); *C04B 35/101* (2013.01);
(Continued)

(58) Field of Classification Search
CPC ........ C04B 38/02; C04B 38/04; C04B 38/06; C04B 38/0605; C04B 38/0615; C04B 38/063; C04B 38/065; C04B 38/0645
USPC ......................................... 501/80, 81, 82, 83
See application file for complete search history.

(56) References Cited

U.S. PATENT DOCUMENTS 4,925,490 A  *  5/1990  Nagai et al. .................... 75/238
5,080,378 A  *  1/1992  Kagawa ........................ 277/404
(Continued)

FOREIGN PATENT DOCUMENTS

| EP | 0 578 408 | 1/1994 |
| EP | 2 025 658 | 2/2009 |
| KR | 2006 0088157 | 8/2006 |

OTHER PUBLICATIONS

Kim, J.Y. et al., "Effects of CuO Content on the Wetting Behavior and Mechanical Properties of a Ag—CuO Braze for Ceramic Joining", Journal of the American Ceramic Society, vol. 88, No. 9, pp. 2521-2527, (Sep. 1, 2005) XP002549264.
(Continued)

*Primary Examiner* — Noah Wiese
(74) *Attorney, Agent, or Firm* — Oblon, McClelland, Maier & Neustadt, L.L.P

(57) ABSTRACT

The present invention relates to a novel process for producing ceramic materials, in particular refractory materials having a reduced relative density. In particular, the invention relates to a process for producing light, refractory materials having non-contiguous pores based on shaped and unshaped materials. These materials can be used as working lining in high-temperature applications. The process is based on the production of spherical, closed and isolated pores in the microstructure of the material. The pores having a pore diameter which can be set in a targeted manner are generated by use of polymer particles, in particular polymethacrylates, in particular polymers or copolymers prepared by means of suspension polymerization, as pore formers which can be burnt out. The polymers or copolymers are present in the form of small spheres having a defined diameter. The introduction of isolated spherical pores allows the production of ceramic materials having a sometimes significantly reduced relative density and improved corrosion resistance and better mechanical strength compared to the prior art. The specific, closed pore system at the same time contributes to reducing the thermal conductivity of the ceramic materials. In addition, the novel process has the advantage that there is no risk of formation of undesirable black cores, even in the production of thick-walled ceramic products.

9 Claims, 5 Drawing Sheets

Figure 1:
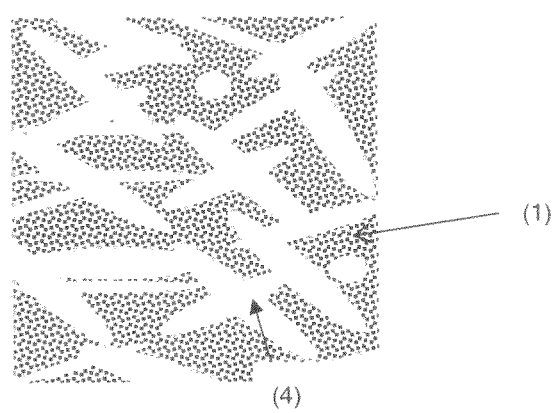

(51) Int. Cl.

| | | |
|---|---|---|
| *C04B 35/638* | (2006.01) | |
| *C04B 38/08* | (2006.01) | |
| *C04B 33/00* | (2006.01) | |
| *C04B 35/101* | (2006.01) | |
| *C04B 35/185* | (2006.01) | |
| *C04B 35/44* | (2006.01) | |
| *C04B 35/66* | (2006.01) | |
| *C04B 111/00* | (2006.01) | |
| *C04B 111/28* | (2006.01) | |

(52) U.S. Cl.
CPC ............... *C04B35/185* (2013.01); *C04B 35/44* (2013.01); *C04B 35/638* (2013.01); *C04B 35/63404* (2013.01); *C04B 35/63408* (2013.01); *C04B 35/63424* (2013.01); *C04B 35/66* (2013.01); *C04B 38/085* (2013.01); *C04B 2111/0081* (2013.01); *C04B 2111/28* (2013.01); *C04B 2235/3217* (2013.01); *C04B 2235/5427* (2013.01); *C04B 2235/5463* (2013.01); *C04B 2235/6562* (2013.01); *C04B 2235/661* (2013.01); *C04B 2235/77* (2013.01); *C04B 2235/80* (2013.01); *C04B 2235/96* (2013.01); *C04B 2235/9615* (2013.01)

(56) References Cited

U.S. PATENT DOCUMENTS

| | | | | |
|---|---|---|---|---|
| 5,395,807 | A | * | 3/1995 | Divakar et al. .................. 501/88 |
| 7,914,874 | B2 | * | 3/2011 | Henry et al. ................... 428/116 |
| 8,158,248 | B2 | * | 4/2012 | Hara et al. ................. 428/314.2 |
| 2007/0231884 | A1 | * | 10/2007 | Kitagawa et al. ........... 435/289.1 |
| 2009/0069167 | A1 | * | 3/2009 | Tardivat et al. ................. 501/84 |
| 2011/0318565 | A1 | * | 12/2011 | Mueller-Zell .............. 428/307.3 |

OTHER PUBLICATIONS

International Search Report Issued Nov. 7, 2013 in PCT/EP12/066437 Filed Aug. 23, 2012.

* cited by examiner

METHOD FOR PRODUCING LIGHT CERAMIC MATERIALS

FIELD OF THE INVENTION

The present invention relates to a novel process for producing ceramic materials, in particular refractory materials having a reduced relative density. In particular, the invention relates to a process for producing light, refractory materials having pores which are not contiguous, which materials can be used for thermal insulation in high-temperature applications.

The process is aimed at producing spherical, closed and isolated pores in the microstructure of the material. The pores having a pore diameter which can be specifically set are produced by use of polymer particles, in particular polymethacrylates, in particular polymers or copolymers prepared by suspension polymerization, as pore formers which can be burnt out. The polymers or copolymers are present in the form of small spheres having a defined diameter. The introduction of isolated spherical pores makes it possible to produce ceramic materials having a sometimes significantly reduced relative density and improved corrosion resistance and better mechanical strength compared to the prior art. The specific, closed pore system at the same time contributes to reducing the thermal conductivity of the ceramic materials. In addition, the novel process has the advantage that there is no risk of formation of undesirable black cores even in the production of thick-walled ceramic products.

PRIOR ART

Porous, refractory ceramics are versatile materials which have, in particular, a high heat resistance and even a refractory nature combined with only a low weight. These materials are used in various high-temperature applications, e.g. in metal winning or processing and also in the cement, lime, gypsum plaster, glass or ceramics industry. Pores are a constituent of most ceramic products. A distinction is made between open pores (pores running all through the material), semiclosed pores (pores closed at one end) and closed pores. Together they make up the total porosity of a material. Pores form an open or closed pore system. In the first case, the porosity consists predominantly of open or semiclosed and contiguous pores. This type of porosity is typical of most ceramic materials. Closed pores occur rarely in conventional ceramic materials.

An open pore system has an adverse effect on the corrosion resistance of ceramic materials. Gaseous and liquid corrosive substances infiltrate the material through such a pore system. In addition, diffusion of solid substances into the material occurs very quickly through the pore system. Closed and isolated pores, on the other hand, do not or not significantly impair the corrosion resistance.

An open pore system is a weak point of the dense refractory materials having a porosity of less than 45% used as corrosion protection. For this reason, the maximum reduction of the porosity is an important aspect in the production of refractory products.

Although a low porosity has a positive effect on the corrosion resistance, it is accompanied by some disadvantages such as a high product weight, a high thermal conductivity and low thermal shock resistance.

According to the prior art, there are various methods of producing porous ceramics. The addition of porous aggregates such as kieselguhr, perlite or hollow ceramic spheres enables only a relatively small proportion of pores in the ceramic to be achieved and the materials are relatively heavy. Although these aggregates do allow hollow spaces to be produced in ceramics, these are not closed and are contiguous. This has an adverse effect on the use properties of such ceramics and restricts their possible use to a few fields.

The foaming of a ceramic raw composition or a ceramic slip, on the other hand, leads to non-uniform pore formation and to fluctuating product qualities. In addition, a high, uniformly distributed proportion of pores is very difficult to realize. A similar situation applies to the addition of blowing agents such as ammonium carbonate or sublimable substances such as naphthalene.

The quality of the refractory ceramics can be increased by a combination of various methods, but an optimum between mechanically very strong and at the same time very light, corrosion-resistant and very heat-resistant ceramics having, for example, particularly good insulating properties can be realized only with difficulty using these methods. Thus, none of these conventional processes is suitable for producing uniformly distributed, spherical, isolated pores.

The production of porous refractory materials with the aid of additives which can be burnt out is likewise prior art. Additives widely used are, for example, coal, coke, sawdust, nutshells, ground cork, polystyrene foam, rice hulls, turf or lignin. The combustion residues of some of these materials, e.g. ash or slag, are very reactive and can impair the use properties of the refractory ceramics, e.g. in terms of the heat resistance.

To reduce the thermal conductivity, these ceramics are porous, generally having an open pore structure. However, the open and contiguous pores at the same time promote corrosion and thus attrition of the material. In addition, the non-uniformly shaped and contiguous pores lead to impairment of the mechanical properties of the refractory materials. Most of the customary pore formers which can be burnt out cannot oxidize completely with a restricted supply of air. This in turn leads to black residues of the pore former in the burnt-out ceramic, known as black cores, which significantly impair the materials' properties.

Such light ceramics of the prior art, in particular for refractory applications, generally have a cold compressive strength in the range from 0.5 to 10 mPa at a porosity in the range from 40% to 80%.

DE 19700727 describes porous bricks and other clay products and also a process for producing such products. The pores having a diameter of 1-10 mm are produced by addition of materials which can be burnt out. Waste materials are, inter alia, used as such. The pores are open and contiguous.

EP 14 33 766 describes a sliding component for sealing elements and its production from carbon particles and phenolic resins. The material contains spherical isolated and homogeneously distributed pores. Complete combustion can be achieved only with difficulty for these particles. In addition, although the particles and thus the resulting pores are quite homogeneously distributed, they have neither a homogeneous size distribution nor a homogeneous shape distribution. However, these aspects have an adverse effect on the mechanical properties of the material. The material is also not suitable for use at high temperatures.

EP 0 578 408 discloses a process for producing ceramic sealing elements composed of silicon carbide. The material contains spherical isolated pores which are produced by addition of materials which can be burnt out, e.g. acrylate, epoxy, polyimide or vinyl resins, polypropylene, polyvinyl chloride or cellulose acetate. However, these materials are, as inevitably follows from the use of resins, used either in liquid form or when cured as non-uniform building material. Regular pores of defined size cannot be realized in this way. This material, too, is not suitable for use at high temperatures.

EP 18 89 821 discloses a process for producing ceramic sliding components and sealing elements. The ceramic contains spherical pores larger than 5 μm and is produced from a mixture of granular powder with spherical resin beads as pore formers. Silicone resin, polystyrene and/or acrylate-styrene copolymer are used as resin. The pores formed are neither homogenously distributed nor isolated. In addition, polystyrene burns without leaving a residue only at very high temperatures and under oxygen. The ceramic sliding components have a specific microstructure and are employed at room temperature or at moderate temperature.

JP 092 99 472 relates to a porous biocompatible implant component. The component consists of two layers. The surface layer contains spherical pores produced by use of spherical acrylate particles. The pores are connected to one another and are not isolated. The material is not suitable for use at high temperatures.

JP 030 01 090 describes a combustion auxiliary composed of highly pure aluminium oxide and a process for producing such a component. The material contains spherical pores having a diameter of less than 600 μm. It is produced from a mixture of thermoplastic resin beads and aluminium oxide powder ($Al_2O_3$). The resin beads consist, for example, of styrene-methyl methacrylate copolymers. The pores are open and not isolated.

KR 2006 088 157 discloses the production of high-porosity ceramic materials having a high strength. As pore formers, use is made of spherical particles of polymethacrylates or crosslinkable polymethacrylates containing ethylene glycol dimethacrylate. The pores in the material are homogenously distributed but are not isolated.

Kim et al. (Journal of the American Ceramic Society (2005), 88(12), 3311-3315) describe a process for producing microcellular mullite. The pores are produced by addition of crosslinked polymer beads having a size of 20 μm. Despite a high porosity of 40-70%, the ceramic materials have a relatively high strength of from 90 to 10 MPa. The high strength was explained by the presence of homogenously distributed spherical pores having a size of less than 20 μm. However, the pores are not explicitly isolated, so that an improvement compared to these materials is achievable. Furthermore, crosslinked polymer beads have the disadvantage that they can usually be removed incompletely only with difficulty. In addition, exclusively pressed lightweight materials are described by Kim et al. Refractory materials are not described. However, these or refractory lightweight materials have to meet quite different requirements in respect of strength and durability.

Object

It was an object of the present invention to provide a novel process by means of which ceramic materials having an improved, compared to the prior art, combination of relative density and insulating properties can be produced.

A further object of the present invention was to provide a process by means of which both shaped and unshaped ceramic materials having improved properties can be produced.

In addition, it was an object of the invention to provide a process for producing dense refractory materials with reduction in the weight of the material, without impairing the use properties such as corrosion resistance and mechanical strength.

A parallel object was to provide a process for producing light thermally insulating materials, i.e. very light materials having an advantageous ratio of strength to porosity and improved corrosion resistance compared to the prior art.

In particular, it was an object of the invention to provide materials having an improved ratio of porosity and strength, compared to the prior art.

In addition, it was an object of the invention to provide a process for producing ceramic materials having improved corrosion resistance compared to the prior art.

In addition, it was an object of the invention to develop a process for producing ceramic materials which allow better thermal insulation.

It was also an object of the invention for the ceramic materials produced by the process to have few or no black cores after burning out and for the burning-out operation to be able to be carried out simply or even simpler than in the prior art.

Further objects which are not explicitly mentioned can be derived from the overall context of the following description, claims and examples.

Achievement of the Objects

The objects are achieved by provision of a novel process for pore formation in ceramics, in particular in shaped and unshaped ceramic materials, by use of novel additives which can be burnt out in the ceramic raw composition. These additives which can be burnt out are spherical polymer particles, preferably thermoplastic, spherical polymer particles. In the present context, thermoplastic means not crosslinked.

The polymer particles used according to the invention are composed of a polymer which has a ceiling temperature of less than 250° C. and a diameter in the range from 0.1 μm to 3 mm, preferably from 5 μm to 3 mm, particularly preferably from 10 μm to 1 mm and very particularly preferably from 15 μm to 200 μm. Here, the range from 0.1 μm to <5 μm forms alternative and technically equally attractive nanopores. In addition, the particle size distribution of the polymer particles is in the range from 0.5 to 2.0, preferably from 0.7 to 1.5. This ceramic raw composition is, according to the invention, burnt out at a temperature which is at least 200° C. above the ceiling temperature of the polymer.

The particle sizes indicated are the median diameter which, according to the invention, is determined by means of laser diffraction particle size analysis using a Coulter diffraction particle size analyzer, preferably a Coulter LS 200. The median diameter is the value of the particle size, at which half of the particles are smaller and the other half of the particles are larger.

A further value for characterizing the particle size distribution is the average diameter. This is the average value of all particles measured by the laser diffraction formed by the instrument. This value, too, can be determined, for example, by means of a Coulter LS 200. However, it may be pointed out that the particle sizes indicated in this text are of the median diameter.

A third parameter referred to in the context of the present invention is the particle size distribution. This is the ratio of the average diameter to the median diameter. This value, too, can be determined directly by means of, for example, a Coulter LS 200. Depending on the shape of the distribution curve, this value can be less than or greater than one. In the case of a particularly broad curve in the region of small particle sizes, the value is, for example, generally smaller than one. In the case of an ideally symmetrical curve, the value is equal to one.

The proportion of polymer particles added to the ceramic raw composition is in the range from 0.5 to 90% by weight, preferably from 1.0 to 80% by weight, particularly preferably from 10 to 70% by weight and in particular from 20 to 60% by weight. Thus, for example, weight reductions of about 6% by weight can be achieved for the ceramic materials when using about 2% by weight of polymer particles in dense ceramic materials. The percentages of polymer particles indicated in the context of the present invention are based on the 100% by weight sum of ceramic raw composition and polymer particles.

Ceramic materials produced by the process of the invention will display a number of improved properties compared to the prior art. In particular, the ceramics display a high proportion of spherical, predominantly closed and isolated pores. The pores perform a variety of functions. The advantages of the ceramics produced according to the invention and having closed, spheroidal and isolated pores are, inter alia:

- improvement of the thermal insulation properties and thus reduced heat loss to the outside
- better corrosion resistance since there is significantly reduced infiltration of corrosive substances into the microstructure of the material
- favourable strength/pore volume ratio in the case of spherical pores
- a pore-free, closed surface which is, in particular, suitable for subsequent glazing
- reduction of the component weight
- reduced raw materials consumption, e.g. ceramic raw composition or make-up water
- reduced energy consumption in production and transport
- reduced energy consumption in use, for example, in furnaces in which the layer of insulation has to be heated concomitantly, or in tunnel kiln cars which have to be moved
- the possibility of reduced plant lining
- improvement in the freezing resistance of ceramic building materials
- sometimes an increase in the toughness of the material and a more advantageous fracture behaviour
- uptake of functional substances, e.g. lubricants in ceramic seals, closure components, etc.
- aiding metal removal and the grinding process when used as abrasives
- significantly reduced to no proportion of black cores and thus improved use properties or visual properties.

The process is suitable for producing both shaped and unshaped products. Novel lightweight products and intermediates can be produced by means of the process.

The pores in the ceramic materials produced according to the prior art, are usually connected to one another and form an open pore system. The pore system sometimes consists of half-closed pores. Closed isolated pores occur rarely in typical ceramics. A particular achievement of the present invention is to provide a process, by means of which it is possible for the first time to realize predominantly isolated, closed pores in a ceramic. These closed pores can have a positive effect on a number of important properties of the ceramic materials. These are, for example:

- Better infiltration resistance to gases and liquids, and, for example, improved corrosion resistance of the material resulting therefrom.
- Isolated, closed pores lead to a better insulating action of the ceramic material.
- Higher strength. Larger and/or non-uniform shaped pores lead to a fracture-inducing excessive stress increase, while isolated, spherical pores contribute to an increase in the strength.
- Thermal shock resistance.
- Thermal and electrical behaviour
- No pores visible on the surface and thus a positive visual appearance of the ceramic.

The improvement in one or more of these properties can be set specifically by means of the composition of the ceramic, the proportion by volume of the pores and the size of the pores. The composition of the polymer particles in the process of the invention can also be set with a view to the burnout conditions and the required pore sizes.

The process of the invention thus allows a wide bandwidth of the combination of various degrees of freedom of the properties.

In particular, the objects are achieved by selection of particularly suitable polymer particles. Three properties of the polymer particles used according to the invention are particularly important: a.) the composition and the resulting thermal behaviour of the polymer, b) the particle size and the particle size distribution and c) the shape of the particles. In addition, the composition of the ceramic material (d) is of great importance.

a) The Composition of the Polymer Particle

An important aspect of the invention, in particular with a view to avoiding black cores, is the residue-free removal of the pore formers during firing or in the case of unshaped products, the first heating-up of the ceramic. This ensures that no black core can form in the material being fired, even in the case of thick-walled objects. A black core impairs the material's properties and qualifies a product as production reject.

The use of polymer particles which burn out without leaving a residue makes it possible to produce large pore ceramic products by means of the method of additives which can be burnt out, also referred to as BO process, without the risk of black cores. The conventional additives do not guarantee this.

Residue-free burnout can be brought about by means of two different polymer properties:

Firstly, the polymer used according to the invention in the process, preferably has a ceiling temperature of less than 280° C., preferably less than 240° C. The ceiling temperature is the temperature at which the polymerization of the monomers to form a polymer and the depolymerization of the polymer to reform the monomers are in equilibrium with one another. It follows from this that above this ceiling temperature, which is determined by the polymer and monomer composition, polymer chains are dissociated into the original monomers, i.e. depolymerization takes place. In the case of most polymers, the ceiling temperature is above a decomposition temperature. In such cases, degradation of functional groups, elimination reactions or the like often occur. Formation of relatively non-volatile degradation products through to carbonization, from which black core formation in turn results, occur. In the case of polymers having a low ceiling temperature which should be below the decomposition temperatures, the polymer chain degrades without leaving a residue at relatively high temperatures as in the firing of the ceramic and the volatile monomers can be removed from the ceramic. Here, a large furnace volume and the application of a reduced pressure can both be advantageous.

A further advantage of this process is that the monomers liberated are burnt in the presence of oxygen in the gas phase, e.g. in an air atmosphere, during the firing operation, or that the process can also be carried out very well with exclusion of oxygen. The production of porous ceramic materials can thus also be carried out in an inert or reducing atmosphere. This is not possible in the case of pore formers known from the prior art. This gives the additional possibility of producing ceramic products having a high porosity from oxidation-susceptible materials such as carbon, borides, carbides, nitrides and others.

A further advantage is that the monomers liberated can be removed from the ceramic without leaving a residue and carbide formation within the ceramic thus does not occur.

Usable polymers having low ceiling temperatures are, for example, polymethacrylates, poly-α-methylstyrene or polyoxymethylenes which have been prepared without depolymerization-inhibiting comonomers. Preference is given to using one of these polymers according to the invention in the process, and particular preference is given to using polymethacrylates or poly-α-methylstyrene.

Particularly when firing is carried out in an oxygen-containing atmosphere, oxidative decomposition of the polymers or of the monomers remaining in the ceramic, e.g. in the form of combustion, likewise takes place. To minimize carbonization resulting therefrom, a second, preferred property of the polymer used becomes important. To improve complete combustion, polymers having a relatively high oxygen content are preferred. The polymer should have an oxygen content of at least 25% by weight, preferably at least 30% by weight. Polymethacrylates are thus particularly preferred. Very particular preference is given to polymethacrylates having a methyl methacrylate content (MMA) of at least 80% by weight, in particular at least 90% by weight, and particular preference is given to using pure PMMA.

b) Particle Size and Particle Size Distribution

The particle size can vary over a wide range. The size of the particles used depends directly on the size of the desired pores. Preference is given to using particles having a diameter in the range from 0.1 μm to 3 mm, preferably from 5 μm to 3 mm, particularly preferably from 10 μm to 1 mm and very particularly preferably from 20 μm to 200 μm. Here, the range from 0.1 μm to <5 μm forms alternative and technically equally attractive nanopores.

For the purposes of the present text, the particle size is the actual average primary particle size. Since the formation of agglomerates is virtually ruled out, the average primary particle size generally corresponds to the actual particle size. The particle size also corresponds approximately to the diameter of a particle which appears approximately round. In the case of particles which do not appear round, the average diameter is determined as average of the shortest and longest diameters. In the present context, the diameter is a distance from one point on the periphery of the particle to another. In addition, this line has to run through the midpoint of the particle.

The particle size can be determined by a person skilled in the art by means of, for example, image analysis or static light scattering.

The addition of polymer particles which burn without leaving a residue and having a narrow monomodal size distribution, in particular, makes it possible to produce a material microstructure having spherical, homogeneously distributed and isolated pores. Here, the particle size distribution of the polymer particles is from 0.5 to 2.0, preferably from 0.7 to 1.5. The particle size distribution is preferably determined by means of a Coulter instrument.

Accordingly, pores having a pore size distribution which is monomodal in the ideal case are obtained. The pore size distribution can, but does not have to, correspond approximately to the particle size distribution of the polymer particles used. This is preferably in the range from 0.2 to 4.0, particularly preferably from 0.5 to 2.0. The pore sizes can be determined, for example, by measurement of micrographs.

As an alternative, various particles having, preferably, an intrinsically monomodal particle size distribution in each case can also be used.

c) Shape of the Particles

The particles are approximately spherical in the ideal case. The surfaces of the particles are generally round but can also have minimal distortion. An aspect ratio can, in a known manner, serve as a measure of the approximation of the geometry to the spherical shape. Here, the maximum aspect ratio which occurs deviates by not more than 20% from the average aspect ratio. This means that the particles are in their totality virtually ideally spherical.

The particles used according to the invention have an average aspect ratio of not more than 1.4, preferably not more than 1.2, particularly preferably not more than 1.1. For the present purposes, the maximum aspect ratio of the particles is the maximum relative ratio which can be formed from two of the three dimensions, length, width and height. Here, the ratio of the largest dimension to the smallest of the other two dimensions is formed in each case. A particle having a length of 150 μm, a width of 50 μm and a height of 100 μm, has, for example, a maximum aspect ratio (of length to width) of 3. Particles having a maximum aspect ratio of 3 can be, for example, short rod-shaped or discus-shaped, tablet-like particles. If the maximum aspect ratio of the particles is, for example, 1.2 or below, the particles have a more or less spherical shape.

To obtain spherical particles, the polymer particles used according to the invention, in particular the polymethacrylate particles are produced by means of a suspension polymerization. Suspension polymers in particular usually display a pronounced spherical shape. Suspension polymerization, in particular of methacrylates, is generally know to those skilled in the art and can be found, for example in "Kunststoffhandbuch volume IX: Polymethacrylate", edited by R. Vieweg, Carl Hanser Verlag, Munich 1975, chapter 2.3.3.

d) Composition of the Cast Ceramic Material The raw compositions used according to the invention for producing the cast ceramic materials can in principle be any raw compositions known to those skilled in the art for producing such materials. In particular, raw compositions for refractory applications are oxide ceramics such as aluminium oxide ($Al_2O_3$), silicon oxide ($SiO_2$), chrome oxide ($Cr_2O_3$), zirconium dioxide ($ZrO_2$), titanium(IV) oxide ($TiO_2$), magnesium oxide (MgO), tin oxide (SnO), or refractory compounds of the oxides, e.g. mullite ($3Al_2O_3*2SiO_2$), spinel ($MgO*Al_2O_3$), zirconium silicate ($ZrO_2*SiO_2$) calcium aluminates ($6Al_2O_3*CaO$, $CaO*Al_2O_3$), forsterite ($2MgO*SiO_2$), calcium silicate ($2CaO*SiO_2$), calcium zirconate ($2CaO*ZrO_2$), cordierite ($2MgO*2Al_2O_3*5SiO_2$), aluminium titanate ($Al_2O_3*TiO_2$) or mixtures of these materials.

However, the processing of nonoxidic ceramics by the process of the invention is also possible. Nonoxidic ceramics include carbon, the carbides, for example boron carbide or silicon carbide; or nitrides, for example boron nitride (BN), silicon nitride ($Si_3N_4$) or aluminium nitride (AlN); borides such as zirconium diboride ($ZrB_2$), calcium hexaboride ($CaB_6$). It is also possible to employ mixtures of oxidic and nonoxidic raw materials having various compositions.

In particular, preference is given to alumina materials, i.e. aluminium oxide, or mullite materials, high-alumina materials having alumina ($Al_2O_3$) and mullite as main components, schamotte materials having mullite as main component, mullite-cordierite materials and spinel materials ($MgO*Al_2O_3$).

e) Production Process

The light ceramic materials of the invention can be produced by any generally known process as shaped and unshaped products. The products can be fired at high temperatures of generally >1000° C. before use or else can be thermally treated in a lower temperature range.

The most important working step in all embodiments of the materials is the introduction of the polymer particles which burn without leaving a residue into a ceramic raw composition. Their nature, e.g. particle structure, water content, binder, rheology, etc., depends on the shaping technique used. Depending on the ceramic, up to 95% by volume, for example, or only a maximum of 70% by volume of polymer particles is introduced. The maximum amount is determined by the fact that care has to be taken that the polymer particles do not come into contact with one another. The subsequent mixing process is carried out in such a way that the homogeneous distribution of the polymer particles firstly remains ensured and, secondly, good mixing is achieved. This is dependent on factors such as the type and nature of the ceramic raw compositions to be produced. In this context, the expression type refers to the form in which the ceramic raw composition is present, e.g. dry or semidry or plastic or castable. The expression nature refers to factors such as particle structure, water content, type of binder, rheology, etc.

The polymers mentioned above are particularly suitable for this purpose. The preferred suspension polymers of polymethacrylate having a very high MMA content are very particularly useful.

After production of the mixed ceramic raw composition containing the polymer particles, further processing steps follow, depending on the product type and use.

Shaped Products

An object having the desired geometry is formed from the ceramic composition containing homogeneously distributed polymer particles using generally known shaping techniques. The choice of a suitable shaping process depends on the geometry of the end product and the associated nature of the ceramic composition.

Shaping can be carried out, for example, by slip casting, injection moulding, shaping of plastic compositions, semidry or dry pressing or other shaping methods. It is also conceivable to fire the ceramic unshaped and subsequently shape it by, for example, cutting or grinding.

In particular, the ceramic raw composition can be shaped by, for example, pressing. Here, the fully formulated ceramic raw composition after mixing is pressed in a mould under a pressure $p_1$. This mould can be a wooden, plastic, metal, stone, gypsum plaster or ceramic mould. The ceramic object produced in this way is removed from the mould and dried at a first temperature $T_1$ which must be below the ceiling temperature and is preferably below the glass transition temperature of the polymer for a time $t_1$. $T_1$, $p_1$ and $t_1$ are determined by the composition of the ceramic raw compositions used and are known to those skilled in the art. As an alternative, the pressed ceramic composition can also remain in the mould and be removed from the mould only after setting and drying. As an alternative, the set and dried ceramic raw composition can also remain in the mould and be removed after the firing operation. In a third alternative embodiment, the mould is burnt without leaving a residue during the firing operation and is removed thereby.

Shaped Unfired Products

After shaping and optionally setting, the products are taken from the mould and subjected to a thermal treatment. This includes the operations customary in ceramics technology. In most cases, the thermal treatment commences at temperatures below 200° C. In this step, the shaped products are dried.

In the case of chemically bound materials or materials bound by carbon, this working step also serves to cure the binder used. As chemical binders, use is made of generally known binders, such as phosphoric acid, aqueous solutions of phosphates or sulphates, water glass, silica sol, etc. In some cases, especially in refractory products, synthetic and natural resins, pitch, tar, etc. are used as carbon binders. For some products from this group of products, the production process ends after drying since they have achieved the required use properties as a result of the chemical binder. In many cases, the chemically bound products, products bound by carbon or products having hydraulic bonding, e.g. refractory concretes, can be subjected to conditioning. To a person skilled in the art, conditioning is a heat treatment in the temperature range below 1000° C. The temperature is dependent on the ceramic composition, but is at least a temperature which is at least 100° C. above, preferably 200° C. above, the ceiling temperature of the polymers present in the polymer particles. In this process step, decomposition processes of the polymer particles and the binders are carried out and the volatile decomposition products liberated are driven off from the material in a controlled manner. As an example, mention may be made of water of crystallization from the chemical or hydraulic binder and decomposition products of the carbon binder.

After conditioning, the heat treatment is concluded for some products since they have achieved the required use properties after conditioning. Examples which may be mentioned are high-alumina materials having phosphate bonding and alumina materials or magnesia materials having carbon bonding.

Shaped Fired Products

The dried products, known as green bodies, are subjected to ceramic firing. A specific group of products is formed by ceramic materials which are produced by means of injection moulding. The products are produced using relatively large amounts of organic additives such as waxes, which have to be removed in a specific operation of binder removal in the temperature range below 1000° C. before high-temperature firing.

The ceramic firing is carried out so that the ceramic particles of the material matrix are sintered as densely as possible. The shape and proportion of the spherical isolated pores should be retained here. Both dry sintering without a liquid phase and sintering in the presence of a liquid phase are suitable for this purpose. In the latter case, the material matrix can be partly or completely vitrified. The temperature of ceramic firing is dependent on the ceramic composition. However, it is at least a temperature which is at least 200° C. above, preferably at least 300° C. above and particularly preferably at least 500° C. above the ceiling temperature of the polymers present in the polymer particles.

To aid the sintering process, reactive, sinter-active components, e.g. nanopowders, micropowders, sintering aids, glass formers, can be added to the mix.

It is not necessary to densify the material matrix fully to a porosity of 0%. Depending on the field of use, the matrix can contain a residual porosity. The size of the matrix pores is critical. The pores should merely be so small that they prevent intrusion of damaging substances such as water, slags or metal melts.

In principle, high densification when carrying out the process of the invention has the disadvantage that monomer removal is made more difficult and occurs only incompletely under some circumstances. Densification of the ceramic matrix can, as an alternative and when required, be effected by appropriate control of the firing regime for the ceramic.

Unshaped Products

The term unshaped products refers to mixtures of aggregates and auxiliaries and additives, first and foremost binders. They are made ready for direct use either in the as-delivered state or after addition of suitable liquids. Insulating refractory products have a total porosity of >45%. After curing, drying and heating, a furnace lining is formed. The unshaped ceramic products, in particular the refractory unshaped products, are continually increasing in importance. Apart from refractory concretes further unshaped ceramic products, e.g. mortars, adhesive cements, tamping compositions, spray compositions, etc., are widely used.

Cast Concretes

In a particular embodiment, the ceramics of the invention are cast concretes. The following section describes this particular aspect, without restricting the invention in any way.

A cast ceramic material is preferably produced from finely particulate refractory concretes or raw compositions, preferably as compositions which flow by themselves. These raw compositions are characterized in that the proportion of particles larger than 0.6 mm is less than 10% by weight, preferably less than 5.0% by weight and particularly preferably less than 1.0% by weight. However, these refractory concretes are merely one possible embodiment of the present invention. The process of the invention for pore formation can be applied to any type of ceramic compositions. Refractory materials are merely a preferred embodiment.

To improve the rheological properties or to improve the strength of the material in the green state (i.e. in the unfired state), the composition can be supplemented with various auxiliaries and additives such as plasticizers, setting agents or binders. For the production of unfired products, e.g. refractory concretes or tamping compositions, the compositions can be produced with the aid of known hydraulic binders such as refractory cement or chemical binders such as water glass, phosphate compounds, magnesium sulphate or polysiloxane binders.

In order to improve the use properties, further additives such as metal fibres, glass fibres, ceramic fibres or other porosity-generating materials can also be mixed into the composition.

The polymer particles used according to the invention are stirred into the ceramic raw composition. The process parameters required for this purpose, e.g. stirrer geometry, stirring speed and stirring time, are a function of the make-up of the ceramic raw composition, the size of the polymer particles and the proportion thereof. This mixing process can be carried out before, during or after addition of further aggregates to the ceramic raw composition. The stirring-in and/or mixing is, in a first embodiment, carried out dry. In an alternative embodiment, it is also possible to use suspensions of polymer particles in a liquid which is preferably water, a synthetic resin or an alcohol. Aqueous suspensions are obtained, for example, as primary product in a suspension polymerization and can be added in this form directly to the ceramic composition. In this case, the water of the suspension can simultaneously be used as make-up water for the ceramic raw composition.

After mixing, the fully formulated ceramic raw composition is poured into a mould. This mould can be a wooden, plastic, metal, gypsum plaster or ceramic mould or be an imprint in sand or a refractory composition. This raw composition is set or solidified in the mould at a first temperature $T_1$, which can be room temperature, for example, and must be below the ceiling temperature and is preferably below the glass transition temperature of the polymer for a time $t_1$. $T_1$ and $t_1$ are determined by the composition of the ceramic raw composition used and are known to those skilled in the art. After setting or solidification, the ceramic intermediate is removed from the mould and subjected to a generally known drying process. As an alternative, the set ceramic raw composition can also remain in the mould and be removed after firing. In a third alternative embodiment, the mould is burnt without leaving a residue during firing and is removed thereby.

Firing is carried out at a once again material-specific temperature $T_2$, which must be above the ceiling temperature of the polymer and the boiling point of the monomers liberated; $T_2$ is preferably at least 200° C. above, preferably at least 300° C. above, particularly preferably at least 500° C. above the ceiling temperature or boiling point, depending on which of the two is higher. In general, such firing operations for ceramics are carried out at above 1000° C., in particular above 1200° C. The time $t_2$ which is necessary for this purpose is once again determined by the composition of the ceramic and the shape and especially the dimensions of the material to be fired.

Firing can be carried out under a protective gas, in an air atmosphere or even in an oxygen-enriched atmosphere without appreciable formation of soot or cracking products in the pores or on the material occurring. A particular advantage of the present invention is that the process can also be carried out with exclusion of oxygen and thus also for oxidation-sensitive materials. This is not possible when using pore formers according to the prior art. The monomers liberated during firing in the absence of oxygen should preferably be drawn off via an appropriate apparatus and collected.

In the case of firing in an oxygen-containing atmosphere, preferably an oxygen-containing atmosphere having a reduced pressure, the monomers liberated after depolymerization burn virtually completely to form water and carbon dioxide and/or carbon monoxide. Here, particular preference is given to using an oxygen-rich polymer having an oxygen content of at least 25% by weight. Such a polymer burns in a particularly soot-free manner. An example of such a polymer is pure polymethyl methacrylate.

For the production of unshaped refractory products such as concretes, tamping compositions, etc. the ceramic composition is installed in industrial plants on site using generally known technologies and passed to the use.

Ceramic Materials

The present invention also provides novel ceramic materials which can be produced by means of the process of the invention. These are light, preferably refractory ceramic materials having a proportion of pores of greater than 20% by volume, preferably in the range from 30 to 90% by volume and particularly preferably from 40 to 70% by volume.

The pores here are spherical and preferably predominately isolated and have a maximum average aspect ratio of not more than 1.4, preferably not more than 1.2, particularly preferably not more than 1.1, analogously to the polymer particles used. The size of the pores of the ceramics produced according to the invention approximates the size of the polymer particles used, but can deviate therefrom by up to 25%, in particular be larger. The pores thus have a diameter in the range from 0.1 µm to 3.5 mm, preferably from 4 µm to 3.5 mm, particularly preferably from 7.5 µm to 1.25 mm and very particularly preferably from 15 µm to 250 µm.

In particular, it is possible to realize ceramics in whose matrix the pores are not in contact or contact one another in a proportion of less than 10%, preferably less than 5%

Furthermore, the ceramic materials of the invention are characterized in that they have a proportion of soot of less than 0.1% by weight, preferably less than 0.05% by weight and particularly preferably less than 0.01% by weight.

Furthermore, the ceramic materials of the invention are preferably characterized in that they have a relative porosity in the range from 5 to 80%, preferably from 10 to 80% and particularly preferably from 20 to 70%. Particularly in these ranges, it is possible to realise ceramics in whose matrix the pores are not in contact or contact one another only in a proportion of less than 10%, preferably less than 5%.

A parameter which likewise describes the ceramic material is the porosity or the relative density. The relative density is defined by the ratio of overall density to pure density, possibly expressed as a percentage. Overall density is the density of the porous body including the pores. Pure density is the density of the ceramic matrix without taking account of the pores.

Porous ceramic materials play an important role as thermal insulation materials both in the building industry and in the refractories industry. However, further fields of use such as reactor technology, catalyst technology, lightweight building technology such as light building ceramics or thermally insulating roofing tiles, thermally insulating wall tiles, kitchen ceramics through to jewelry production are, for example, also conceivable for the ceramic materials of the invention. The materials produced according to the invention are particularly suitable for high-temperature applications such as interior insulation of high-temperature furnaces or the construction of tunnel kiln cars. Here, the ceramic product can be produced and used as shaped or unshaped product. Unshaped products can subsequently be cut, sawn or ground. Furthermore, the ceramic product can be produced and processed further as fired or unfired products.

EXAMPLES

Measurement Methods

Particle size distribution of the polymer particles: the measurement is carried out using a Coulter instrument LS 200. Sample preparation: 2 spatulas of test substance are slurried in about 20 ml of deionized water in a 50 ml glass beaker. One drop of Triton X-100 solution is subsequently added and the sample is de-aerated for 1 minute in an external ultrasonic bath.

Measurement procedure: the measurement is carried out at a concentration of from 9% to 11%. The course of the measurement is computer-controlled. Three individual measurements are carried out. The results reported are the average $d_{V50}$ of these.

Thermogravimetric (TGA) tests in an air atmosphere using a heating rate of 5 K/min to a maximum temperature of 1000° C. This temperature is maintained until the weight is constant.

Weight of sample: pure polymer particles: about 2 g
Polymer particles embedded in a refractory matrix: about 20 g The determination of the basic properties of the materials examined was carried out by methods based on the following EN DIN standards:

Open porosity (OP) and overall density (OD): as per EN DIN 993-1
Cold compressive strength (CCS): as per EN DIN 993-5
Shrinkage (S): as per EN DIN 993-10

The polymers of the Degacryl grade (available from Evonik Röhm GmbH) used are suspension polymers of pure PMMA. In detail, the products used have the following characteristics. The weight average molecular weight was determined by means of gel permeation chromatography (GPC).

DEGACRYL M449: PMMA with $M_w$: 400 000-500 000 and $d_{v50}$: 90-110 μm
DEGACRYL M527: PMMA with $M_w$: 450 000-560 000 and $d_{v50}$: 33-41 μm
DEGACRYL M546: PMMA with $M_w$: 400 000-500 000 and $d_{v50}$: 55-70 μm A) Light Thermally Insulating Ceramics Examples 1-4

Light Cast Refractory Materials

A fine-grained refractory concrete as mixture of calcined alumina (CT) and a polymer body was examined as ceramic raw composition. To study the influence of a coarser aluminium oxide, mixtures comprising sintered alumina (T60, particle size less than 45 μm) were also examined. As binder, use was made of 4 parts by weight of calcium aluminate refractory cement: the concrete composition was produced using 12% by weight (per 100 parts of dry mass) of water (referred to as make-up water). DEGACRYL M449 (M449) in various added amounts was used as polymer body. The polymer particles were firstly mixed with the fully mixed concrete raw composition by stirring. Cylindrical test specimens (diameter and height 46 mm) were cast from the ceramic raw composition containing the polymer particles. This was effected by pouring into a plastic mould. The test specimens were subsequently dried at 110° C. for four hours. After drying, the ceramic was fired at 1500° C. in an air atmosphere for 4 hours. The composition of the mixtures examined and the properties of the fired test specimens are shown in Table 1.

TABLE 1

Light cast refractory materials

| | Composition (%) | | | Overall density (fired) | | Cold compressive strength | Shrinkage |
|---|---|---|---|---|---|---|---|
| | CT | T60 | M449 | (g/cm³) | relative (%) | (N/mm²) | (%) |
| Example 1 | 50.0 | — | 50.0 | 0.76 | 19.5 | 0.8 | 2.8 |
| Example 2 | 31.3 | 31.3 | 37.5 | 0.95 | 24.4 | 3.1 | 1.3 |
| Example 3 | 65.0 | — | 35.0 | 1.13 | 29.0 | 1.7 | 4.7 |
| Example 4 | 31.3 | 31.3 | 37.5 | 0.85 | 21.8 | 0.6 | 1.7 |

Results

The cast light refractory materials according to the invention display very low overall densities. The overall density is in the range from about 16 to 30% of the theoretical value. This corresponds to a porosity in the range from 70 to 84%.

The densification of the microstructure can be controlled by the magnitude of the proportion of polymer particles.

The materials have a low cold compressive strength which is characteristic of the type of material due to the high porosity. The CCS value can be additionally influenced in a positive way by targeted measures. These include, inter alia, the partial replacement of the calcined alumina by fine sintered alumina.

It is clear from the TGA curves appended to the drawings that the polymer particles used according to the invention can be removed from the ceramic without leaving a residue at temperatures of less than 500° C.

Example 5

Light Cast Alumina Materials (with Comparative Example 1)

As ceramic raw composition, a slip was produced from 90% by weight of calcined alumina and 10% by weight of a calcium aluminate as binder. The concrete composition was admixed with 14.5% by weight (per 100 parts of dry mass) of make-up water. 30% by weight of DEGACRYL M527 (M527) (based on 100% by weight of slip) was used as polymer particles. The polymer particles were firstly mixed with the fully mixed ceramic raw composition by stirring. Cylindrical test specimens (diameter and height 46 mm) were subsequently cast from the ceramic raw composition containing the polymer particles. This was effected by pouring into a plastic mould. The test specimens were subsequently dried at 110° C. for four hours. After drying, the ceramic was fired at 1500° C. in an air atmosphere for 4 hours.

For comparison, mixtures with 20% by weight of a conventional aggregate which can be burnt out (shavings) were also examined. To be able to incorporate this amount of aggregate into the ceramic composition, the amount of water added had to be increased to about 28% by weight. The other production and test conditions were identical. The results achieved are shown in Table 2.

mer display a very high strength. This is almost 75% higher than that of the materials containing the conventional other aggregate.

Examples 6-9

Light Cast Mullite Materials (with Comparative Example 2)

A homogeneous mixture of a mullite raw mixture and Degacryl M449 was produced by means of stirring. The mullite raw mixture was a raw materials mixture used industrially for producing sintered mullite. The moisture content of the mixture was about 16% by weight. The proportion of Degacryl was, dependent on the example, in the range from 10 to 70% by weight (see Table 3). The make-up water requirement was, as a function of the proportion of Degacryl, in the range from 33 to 45% by weight. The ceramic raw materials were firstly mixed with the make-up water. Degacryl M449 was introduced at the end of the mixing process and homogeneously dispersed. The test specimens (diameter and height in each case 46 mm) were produced without binder by casting into a plastic mould. The mouldings were dried at 110° C., for 24 hours. The test specimens were subsequently subjected to a two-stage firing process in an air atmosphere, using the following parameters:

TABLE 2 light cast alumina materials

| | | Aggregate | | Dried | | Fired | | | |
|---|---|---|---|---|---|---|---|---|---|
| | Designation | Amount (% by weight) | OD g/cm$^3$ | CCS N/mm$^2$ | OD g/cm$^3$ | relative (%) | CCS N/mm$^2$ | Shrinkage % |
| Example 5 | DEGACRYL M527 | 30 | 1.90 | 13.3 | 1.57 | 39.3 | 43.0 | 5.2 |
| Comparative Example 1 | Conventional | 20 | 1.58 | 0.8 | 1.55 | 38.8 | 24.7 | 5.1 |

Results
The ceramic composition with an addition of DEGACRYL requires significantly less (about 50%) make-up water compared to the conventional product despite a higher amount of aggregate.
The strength of the dried DEGACRYL composition is very high compared to the conventional aggregate
At an approximately equal overall density, the fired ceramic compositions containing proportions of poly- Stage I. firing temperature 1000° C., heating rate 1 K/min, without hold time Stage II. firing temperature 1600° C., heating rate 5 K/min, hold time 4 h The overall density (OD) was determined on the dried test specimens. The overall density (OD), the open porosity (OP), the cold compressive strength (CCS) and the shrinkage (S) were determined on the fired specimens.

TABLE 3

| | Degacryl M449 % | H$_2$O requirement % | 110° C. OD g/cm$^3$ | 1000° C. | | | 1600° C. | | | |
|---|---|---|---|---|---|---|---|---|---|---|
| | | | | OD g/cm$^3$ | OP % | S % | OD g/cm$^3$ | OP % | S % | CCS N/mm$^2$ |
| CE 2 | 0 | 33.5 | 1.32 | 1.27 | 59.0 | 0.9 | 1.77 | 42.7 | 11.7 | 32.5 |
| Ex. 6 | 10 | 34.0 | 1.27 | 1.10 | 64.7 | 1.0 | 1.58 | 49.2 | 12.7 | 27.4 |
| Ex. 7 | 30 | 34.0 | 1.21 | 0.86 | 72.4 | 1.0 | 1.24 | 60.1 | 12.7 | 10.5 |
| Ex. 8 | 50 | 42.5 | 1.14 | 0.70 | 77.3 | 1.9 | 1.02 | 67.1 | 13.5 | 7.8 |
| Ex. 9 | 70 | 42.5 | 1.10 | 0.59 | 80.9 | 1.9 | 0.88 | 71.6 | 14.6 | 4.1 |

The $H_2O$ Additions are Based on the Mass without Deqacryl M449.

The results show that light, highly porous mullite materials having good strength values can be produced with the addition of polymer particles.

Examples 10-13

Light Cast $Al_2O_3$—$CA_6$ Materials (with Comparative Example 3)

In these examples, refractory ceramics corresponding to commercially available ceramics containing calcium hexaaluminate ($CaO*6Al_2O_3$) as light microporous aggregate were produced according to the invention. The said product contains about 8.5% by weight of CaO and about 91% by weight of $Al_2O_3$. It has an open porosity of about 75% by volume. The product is used as particulate material for producing light thermally insulating refractory products. A disadvantage of the material is the relatively high CaO content which impairs the corrosion resistance and the thermomechanical properties of the refractory materials.

In these examples, ceramics according to the invention having a lower CaO content but thermal insulation properties comparable to the conventional product were produced. Degacryl M 527 was used as pore former.

The ceramic composition used as slip was composed of 90% by weight of calcined alumina NO 645, 10% by weight of calcium aluminate cement SECAR 71, 1% by weight of plasticizer (ADS, ADW) and various amounts of make-up water (see Table 4). The calculated chemical composition after setting of the mixture used is 3% by weight of CaO and 97% by weight of $Al_2O_3$. This corresponds to a calcium hexaaluminate content of about 34% by weight. The remainder is formed by α-alumina (α-$Al_2O_3$). The Degacryl content was, depending on the example, in the range from 10 to 70% by weight (see Table 4). The ceramic raw materials were firstly mixed with the make-up water. The make-up water requirement was, depending on the Degacryl content, in the range from 12 to 30% by weight (see Table 4). Degacryl M527 was added at the end of the mixing process and homogeneously dispersed.

The test specimens (diameter and height in each case 46 mm) were produced by casting into a plastic mould. After setting, the mouldings were dried at 110° C. for 24 hours. The test specimens were subsequently subjected to a two-stage firing process in an air atmosphere using the following parameters:

Stage I. firing temperature 1000° C., heating rate 1 K/min, without hold time

Stage II. firing temperature 1600° C., heating rate 5 K/min, hold time 4 hours

The overall density (OD) was determined on the dried test specimens. The overall density (OD), the open porosity (OP), the cold compressive strength (CCS) and the shrinkage (S) were determined on the fired specimens.

TABLE 4

|  | Degacryl M527 % | $H_2O$ requirement % | 110° C. OD g/cm³ | 1000° C. | | | 1600° C. | | | |
| --- | --- | --- | --- | --- | --- | --- | --- | --- | --- | --- |
|  |  |  |  | OD g/cm³ | OP % | S % | OD g/cm³ | OP % | S % | CCS N/mm² |
| CE 3 | 0 | 12.5 | 2.67 | 2.58 | 33.8 | 0.1 | 3.07 | 21.4 | 6.0 | 261 |
| Ex. 10 | 10 | 12.5 | 2.37 | 2.13 | 45.5 | 0.4 | 2.48 | 36.5 | 5.6 | 217 |
| Ex. 11 | 30 | 14.5 | 1.95 | 1.45 | 62.9 | −0.2 | 1.68 | 56.9 | 5.0 | 38 |
| Ex. 12 | 50 | 20.0 | 1.64 | 1.07 | 72.6 | −0.1 | 1.30 | 66.6 | 6.7 | 21 |
| Ex. 13 | 70 | 30.0 | 1.40 | 0.83 | 78.7 | 0.9 | 1.03 | 73.5 | 8.2 | 9.8 |

The $H_2O$ additions are based on the mass without Degacryl M527.

The additive Degacryl M527 brings about an increase in the open porosity. At an addition of over 30% by weight, an increase to more than 55% by volume can even be achieved. Even greater added amounts result in light, highly porous materials having an open porosity of greater than 70% by volume. These materials in particular display a very good ratio of strength to overall density.

Examples 14-17

Light Cast Alumina Materials Having a Proportion of Coarse Particles (with Comparative Example 4)

These examples show that light ceramic materials according to the invention can be produced even with addition of coarsely particulate components. On the basis of the results achieved in the preliminary tests, a ceramic composition was used as slip composed of 47.5% by weight of sintered alumina T60, 47.5% by weight of calcined alumina No 645, 5% by weight of calcium aluminate cement SECAR 71, 1% by weight of plasticizer (ADS, ADW) and various amounts of make-up water (see Table 5) for the experiments.

Degacryl M546 was used as polymer body. The Degacryl content was in the range from 10 to 70% by weight (for amounts, see Table 5). The ceramic raw materials were firstly mixed with the make-up water. The make-up water requirement was, depending on the Degacryl content, in the range from 12 to 30% by weight (see Table 5). Degacryl M546 was added at the end of the mixing process and homogenously dispersed by means of stirring. The test specimens (diameter and height in each case 46 mm) were produced by casting into a plastic mould. After setting, the mouldings were dried at 110° C. for 24 hours. The test specimens were subsequently subjected to a two-stage firing process in an air atmosphere using the following parameters:

Stage I. firing temperature 1000° C., heating rate 1 K/min, without hold time

Stage II. firing temperature 1600° C., heating rate 5 K/min, hold time 4 h

The overall density (OD) was determined on the dried test specimens. The overall density (OD), the open porosity (OP), the cold compressive strength (CCS) and the shrinkage (S) were determined on the fired samples.

TABLE 5

|  | Degacryl M546 % | H$_2$O requirement % | 110° C. OD g/cm$^3$ | 1000° C. | | | 1600° C. | | | |
|---|---|---|---|---|---|---|---|---|---|---|
|  |  |  |  | OD g/cm$^3$ | OP % | S % | OD g/cm$^3$ | OP % | S % | CCS N/mm$^2$ |
| CE 4 | 0 | 12.5 | 2.64 | 2.58 | 33.8 | 0.1 | 2.90 | 25.6 | 4.1 | 227 |
| Ex. 14 | 10 | 12.5 | 2.33 | 2.07 | 46.9 | −0.2 | 2.34 | 40.1 | 3.9 | 140 |
| Ex. 15 | 30 | 14.5 | 1.86 | 1.40 | 64.2 | −0.2 | 1.56 | 60.0 | 3.8 | 23 |
| Ex. 16 | 50 | 20.0 | 1.53 | 1.00 | 74.2 | 0.3 | 1.14 | 70.9 | 4.5 | 12 |
| Ex. 17 | 70 | 30.0 | 1.33 | 0.75 | 80.9 | 0.2 | 0.87 | 77.6 | 5.3 | 3.8 |

The H$_2$O additions are based on the mass without Degacryl M546.

Even after addition of a coarse particle fraction, a refractory ceramic according to the invention can be produced. In addition, the firing shrinkage of the materials can even be reduced here by addition of Degacryl. On the other hand, the coarse particle fraction effects a reduction in the strength values.

Figure 5:
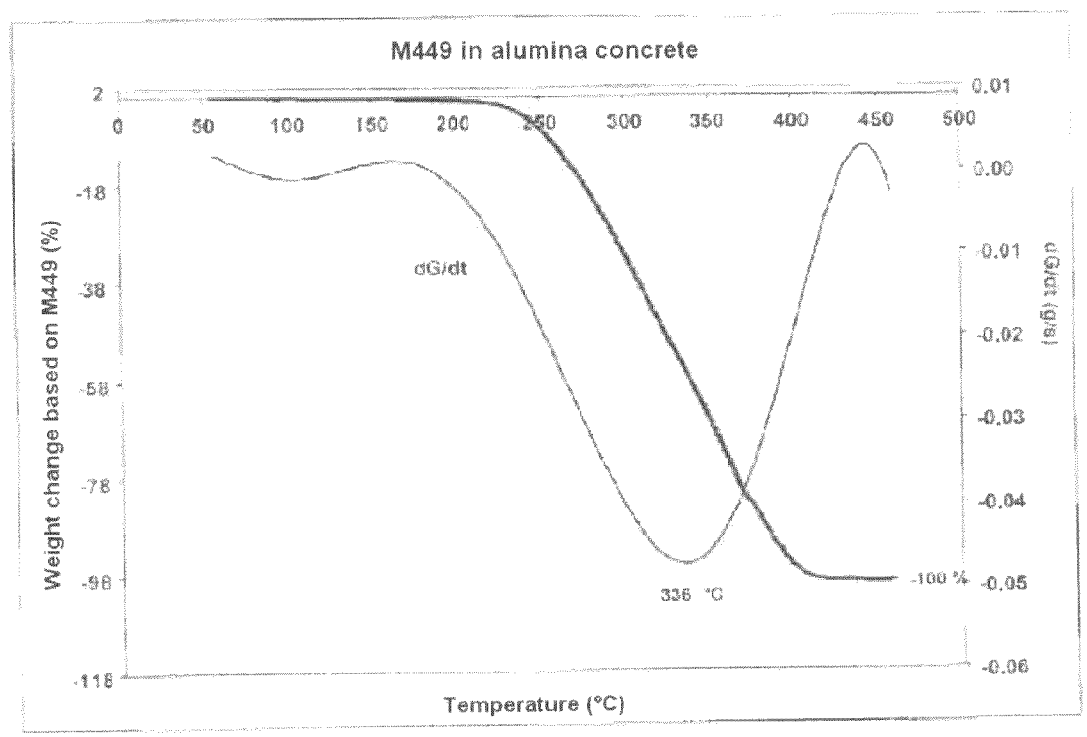
Figure 6:
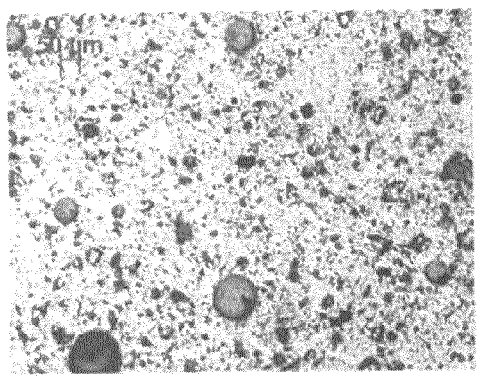
Figure 7:
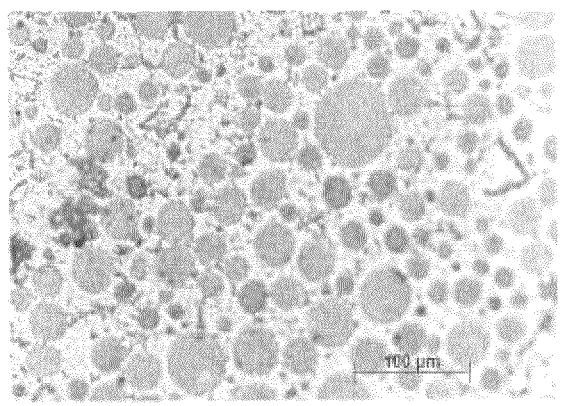

The formation of spherical and isolated pores in the materials from Examples 15 and 17 and the absence of such pores in the case of Comparative Example CE 4 can readily be seen from FIGS. 5-7.

Example 18

Comparison with Conventional Aggregates which can be Burnt Out (with Comparative Example 5)

A ceramic composition comprising 90% by weight of calcined alumina NO 645 and 10% by weight of calcium aluminate cement SECAR 71 was used as slip. 1% by weight of plasticizer (ADS+ADW) and 14.5 percent by weight of make-up water were additionally added to this. This composition was divided into two equal portions. 30% by weight of Degacryl M527 was subsequently added to the first portion for Example 18 and 20% by weight of shavings was added to the second portion for Comparative Example 5. Both amounts of the aggregates had the same volume.

The polymer particles are firstly mixed with the fully mixed ceramic composition by stirring in Example 18. Cylindrical test specimens (diameter and height in each case 46 mm) were produced from the slip containing the polymer particles by casting into a plastic mould. The test specimens were subsequently dried at 110° C. for 4 hours. After drying the ceramic is fired at 1500° C. in an air atmosphere for 4 hours.

In the case of Comparative Example 5, the corresponding procedure was followed with addition of 20% by weight of a conventional aggregate which can be burnt out (shavings). In order to be able to incorporate this amount of aggregate into the slip of ceramic composition, the addition of water had to be increased to about 28% by weight. The other production and test conditions were the same in both cases. The results achieved are shown in Table 5

TABLE 5

| | | Light cast Al$_2$O$_3$ materials | | | | | |
|---|---|---|---|---|---|---|---|
| | Aggregate | | Dried | | Fired | | |
| | Designation | Amount % | OD g/cm$^3$ | CCS N/mm$^2$ | OD g/cm$^3$ | CCS relative (%) | CCS N/mm$^2$ | Shrinkage % |
| Ex. 18 | DEGACRYL M527 | 30 | 1.90 | 13.3 | 1.57 | 39.3 | 43.0 | 5.2 |
| CE 5 | Shavings | 20 | 1.58 | 0.8 | 1.55 | 38.8 | 24.7 | 5.1 |

The ceramic composition with addition of Degacryl required significantly less (by about 50%) make-up water compared to the product according to the prior art despite a larger amount of aggregate. The strength of the dried Degacryl composition is very high compared to the aggregate according to the prior art. At approximately the same overall density, the fired ceramic compositions containing proportions of polymer are characterized by a very high strength. It is virtually 75% higher than that of the materials containing the conventional aggregate.

Example 19 and Comparative Example 6

Dry-Pressed Light Materials

A finely particulate mullite material, max. particle size 100 μm, served as model. DEGACRYL M449 was employed as the aggregate which could be burnt out. The proportion of the polymer was 30% by weight. The mullite raw material was dry mixed with the DEGACRYL. 10% by weight of sulphite waste liquor was added as binder. Cylindrical standard test specimens 50×50 mm were produced from the homogeneously mixed mix by uniaxial pressing in a steel mould. The pressing pressure was 50 MPa. The test specimens were dried at 110° C. for 24 hours and then fired at 1500° C. for 2 hours. The cold compressive strength and overall density of the fired test specimens were examined. For comparison, mullite materials produced using 30% by weight of wood sawdust were also examined. Production and testing were identical. The results achieved are shown in Table 6.

TABLE 6

|  | Aggregate which can be burnt out | Overall density | | CCS (N/mm²) |
|---|---|---|---|---|
|  |  | (g/cm³) | relative to TD (%) |  |
| Example 10 | DEGACRYL M449 | 1.03 | 32.9 | 0.9 |
| CE 6 | Wood sawdust | 1.03 | 32.9 | 0.4 |

TD = Theoretical density of the material (pure density)

The strength of the light mullite materials produced using DEGACRYL is a factor of 2.2 higher than that obtained using conventional aggregate.

Example 20 and Comparative Example 7

Plastically Moulded Refractory Light Materials

This example specifically relates to a plastically moulded schamotte material. A refractory clay served as basic raw material. DEGACRYL M527 was employed as the aggregate which could be burnt out. The plastic ceramic composition was produced from 82% by weight of clay and 12% by weight of water. The composition was then homogeneously mixed with the polymer in a ratio of 30% by weight of DEGACRYL M527 per 100% by weight of ceramic composition. Cubic test specimens having an edge length of 30 mm were produced from the plastic composition. The test specimens were dried at 110° C. for 24 hours and then fired at 1000° C. for 2 hours. The cold compressive strength and the overall density were determined on the fired test specimens. For comparison, schamotte materials produced using wood sawdust were also examined (see Comparative Example 4). Owing to difficulties with production of the composition containing large amounts of wood sawdust, the proportion of this aggregate was reduced to 20% by weight. The other production and test conditions remain unchanged. The results achieved are shown in Table 7.

TABLE 7

Properties of plastic light schamotte materials

|  | Aggregate which can be burnt out | Amount added (parts by weight per 100 parts by weight of ceramic composition) | Overall density (g/cm³) | CCS (Nmm²) |
|---|---|---|---|---|
| Example 20 | DEGACRYL M527 | 30 | 0.83 | 4.5 |
| CE 7 | Wood sawdust | 20 | 1.01 | 4.7 |

The strength of the light schamotte produced using DEGACRYL is, at a virtually 20% lower overall density, approximately as strong as the product produced using traditional aggregates.

B) Dense Refractory Ceramics

Examples 21-25

Pressed Alumina Materials with Comparative Example 8

The objective of this series of experiments was to compare various Degacryl grades: DEGACRYL M449, DEGACRYL M527, DEGACRYL M546.

The amount of polymer particles added is:
Comparative Example 8: 0% by weight
Example 21: 1% by weight of DEGACRYL M449
Example 22: 5% by weight of DEGACRYL M449
Example 23: 10% by weight of DEGACRYL M449
Example 24: 5% by weight of DEGACRYL M527
Example 25: 5% by weight of DEGACRYL M546

The experiments were carried out on a pressed alumina material having the following particle structure:
Sintered alumina: 1-2 mm-50% by weight
Sintered alumina: 0.2-0.6 mm-10% by weight
Sintered alumina: <0.1 mm-40% by weight
Sulphite liquor (4% by weight) is used as temporary binder. The polymer particles (amounts: see below) are firstly mixed dry with the ceramic raw composition by stirring. Test specimens having edge lengths of 36 mm are pressed from the ceramic raw composition containing the polymer particles. This is effected by uniaxial pressing in a steel mould under a pressing pressure of 100 MPa. The test specimens are subsequently dried at 110° C. for 5 hours. After drying, the ceramic is fired at 1500° C. in an air atmosphere for 4 hours.

The results are shown in Table 8.

TABLE 8

|  | Overall density (dried) | | Overall density (fired) | | Cold compressive strength | | Shrinkage (%) |
|---|---|---|---|---|---|---|---|
|  | (g/cm³) | relative | (g/cm³) | relative | (N/mm²) | relative |  |
| CE 8 | 2.84 | 100.0 | 2.82 | 100.0 | 24.1 | 100.0 | 0.3 |
| Ex. 21 | 2.79 | 98.2 | 2.74 | 97.1 | 18.4 | 76.4 | 0.3 |
| Ex. 22 | 2.62 | 92.0 | 2.49 | 88.2 | 6.8 | 28.1 | 0.4 |
| Ex. 23 | 2.42 | 85.1 | 2.21 | 78.5 | 2.4 | 10.1 | 0.4 |
| Ex. 24 | 2.57 | 90.4 | 2.45 | 87.0 | 5.0 | 20.9 | 0.4 |
| Ex. 25 | 2.60 | 91.3 | 2.47 | 87.7 | 6.3 | 26.2 | 0.4 |

Results

Addition of DEGACRYL to a pressed alumina material brings about a significant decrease in its overall density In a direct comparison, the M449 and M527 products perform better than M546.

Example 26

Pressed Alumina Material Using a Reactive Binder with Comparative Example 9

The objective of the study was to test whether the decrease in strength caused by DEGACRYL could be reduced by use of a reactive binder. The experiments were carried out on a pressed alumina material having the particle structure as in Examples 21-25. Degacryl M527 served as polymer particles. The product was introduced dry and mixed with other components. The amount added was 2% by weight. The test specimens (diameter=height=36 mm) were produced by uniaxial pressing in a steel mould using a pressing pressure of 100 MPa. SDX gel (4%) is used as reactive binder. The dried (110° C., 10 h) test specimens are fired at 1500° C., in an air atmosphere for 4 hours. The results are shown in Table 9.

Comparative Example 9 was carried out analogously without addition of the polymer particles.

TABLE 9

| | M527 content (% by weight) | Cold compressive strength (N/mm²) | Overall density (g/cm³) | Shrinkage (%) |
|---|---|---|---|---|
| Comparative Example 9 | 0 | 48.4 | 2.92 | 0 |
| Example 26 | 2 | 34.6 | 2.78 | 0 |

Results

The addition of 2% by weight of polymer particles results in a reduction in the overall density of about 5%.

The decrease in strength of the pressed alumina materials bound by means of SDX gel is about 23%. Addition of a comparable amount of M449 to the alumina material with a conventional binder brings about a reduction in strength of about 40%. It follows from this that the weakening of the microstructure of the materials produced using DEGACRYL can be significantly reduced by use of a reactive binder.

Examples 27-31

Finely Particulate Alumina Concrete with Comparative Example 10

A finely particulate alumina concrete having the following particle structure: sintered alumina <0.045 mm-50% by weight, calcined alumina 50% by weight served as experimental material. The DEGACRYL product M527 was used as pore former. It was introduced dry and mixed with other components. The added amount is: 0, 1, 2, 5, 7 and 10% by weight. The test specimens (diameter=height=46 mm) were produced by casting into a plastic mould. A calcium aluminate refractory cement (4%) is used as binder. The set and dried (110° C., 10 h) test specimens were fired at 1600° C. in an air atmosphere for 4 hours. The following properties are determined on the fired test specimens as a function of the amount of M527 added: overall density (OD), open porosity (OP), cold compressive strength (CCS), linear shrinkage (S). The results obtained are shown in Table 10.

TABLE 10

| | Proportion of M527 (% by weight) | 110° C. | | 1600° C. | | |
|---|---|---|---|---|---|---|
| | | OD (g/cm³) | S (%) | CCS (N/mm²) | OP (%) | OD (g/cm3) |
| CE 10 | 0 | 2.63 | 4.9 | 274.4 | 22.7 | 3.05 |
| Example 27 | 1 | 2.59 | 5.4 | 270.9 | 23.7 | 3.01 |
| Example 28 | 2 | 2.57 | 5.0 | 266.8 | 24.4 | 2.96 |
| Example 29 | 5 | 2.50 | 5.3 | 232.4 | 29.0 | 2.77 |
| Example 30 | 7 | 2.42 | 5.4 | 221.7 | 32.4 | 2.65 |
| Example 31 | 10 | 2.37 | 5.2 | 179.1 | 35.6 | 2.53 |

Result

The overall density of the finely particulate alumina concretes can be reduced by up to 5% by addition of M527 without any appreciable impairment of the other materials parameters. The added amount of M527 required for this is about 2-3%.

Examples 32-33

Coarsely Particulate Alumina Concrete with Comparative Example 11

An industrial alumina concrete served as experimental material. The DEGACRYL product M527 was used as pore former. It was introduced dry and mixed with other components. The amount added is: 0, 2, 5% by weight. The test specimens (diameter=height=46 mm) are produced by casting into a plastic mould. A calcium aluminate refractory cement (4%) is used as binder. The set and dried (110° C., 10 h) test specimens were fired at 1600° C. in an air atmosphere for 4 hours. The following properties are determined on fired test specimens as a function of the amount of M527 added: overall density (OD), open porosity (OP), cold compressive strength (CCS), linear shrinkage (S). The results obtained are shown in Table 11.

TABLE 11

| | Proportion of M527 (%) | 110° C. | | 1600° C. | | |
|---|---|---|---|---|---|---|
| | | OD (g/cm³) | S (%) | CCS (N/mm²) | OP (%) | OD (g/cm3) |
| Comparative Example 11 | 0 | 3.21 | 0.80 | 247.14 | 11.97 | 3.25 |
| Example 32 | 2 | 3.10 | 0.71 | 222.16 | 18.28 | 3.08 |
| Example 33 | 5 | 2.96 | 0.52 | 77.79 | 26.19 | 2.84 |

Result

In a coarsely particulate industrial alumina concrete, the justifiable added amount of M527 is 2-3%. The resulting reduction in the weight of the industrial concretes is 5-6%.

DRAWINGS

Figure 2:
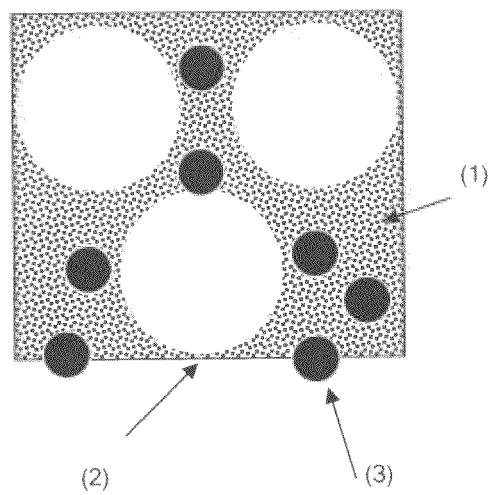

FIG. 1: Schematic depiction of the microstructure of a light refractory ceramic with pore formation according to the prior art with (1) matrix of the ceramics; (4) pore which is not according to the invention; the coarse particles of a pressed ceramic which are optionally present in a manner analogous to FIG. 2 are not shown in the interests of clarity FIG. 2: Schematic depiction of the microstructure of a light, pressed refractory ceramic with pore formation as per the process of the invention with (1) matrix of the ceramic; (2) pore; (3) coarse particle. A cast ceramic would have no coarse particles.

Figure 3:
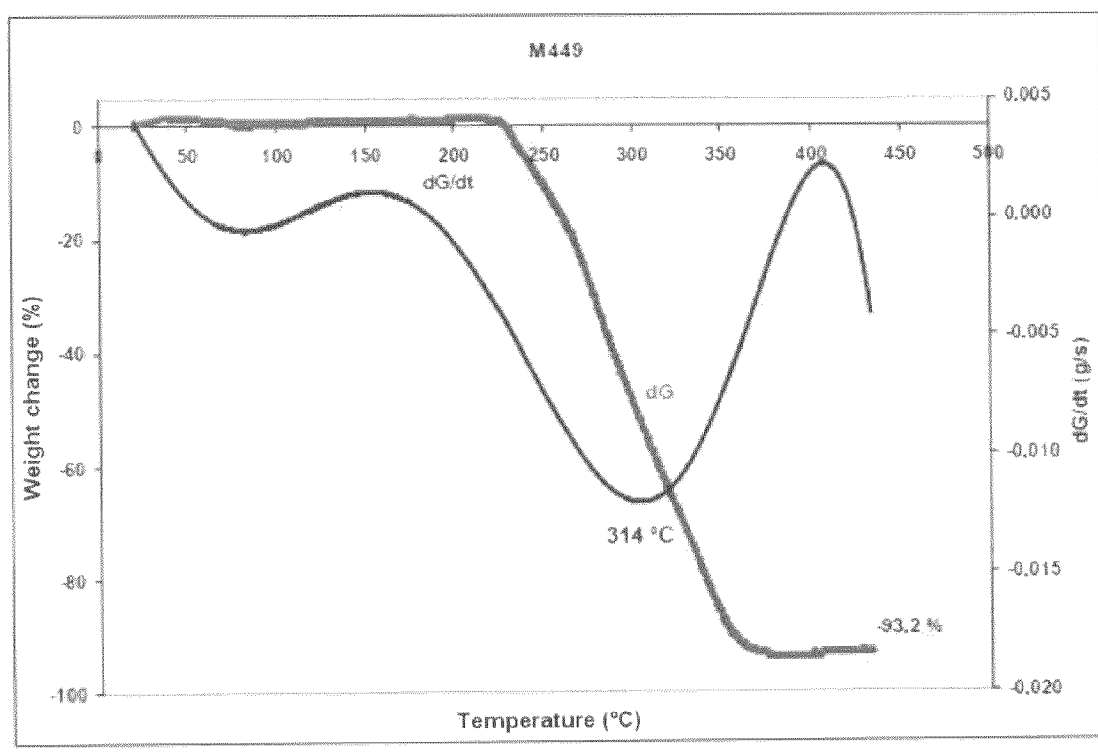

FIG. 3: TGA of the polymer particle DEGACRYL M449

Figure 4:
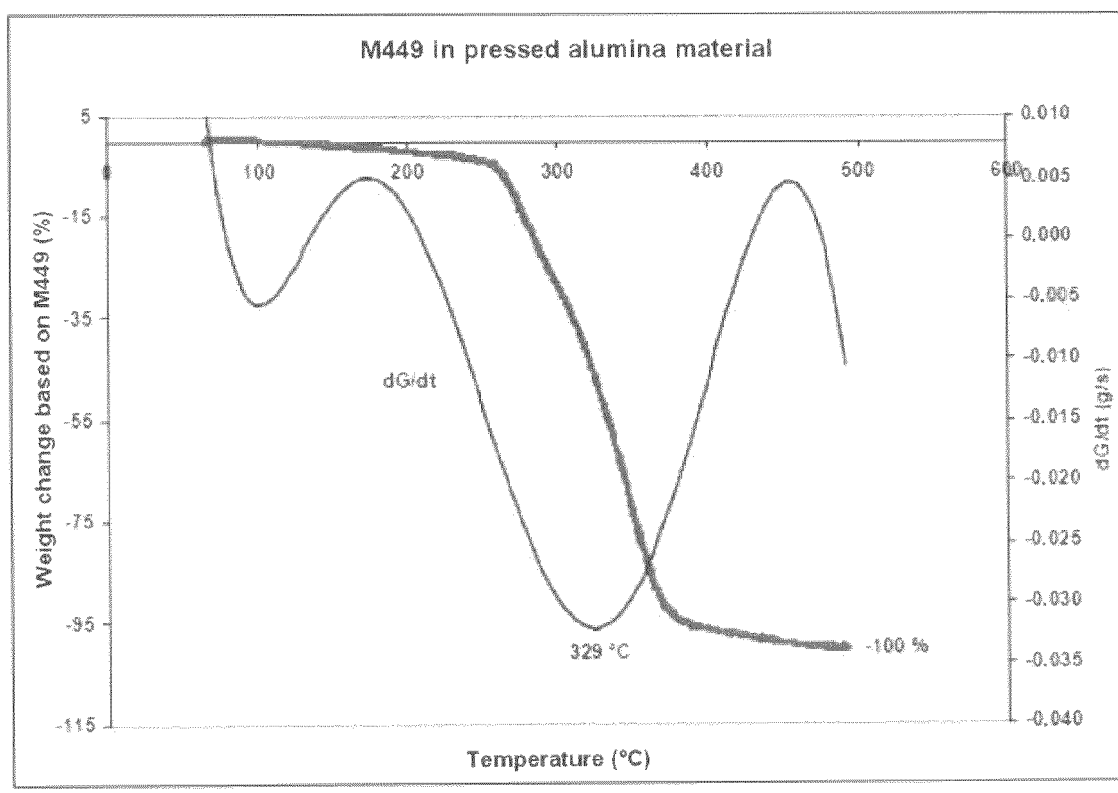

FIG. 4: TGA of DEGACRYL M449 in a refractory alumina concrete as per Example 3; weight normalized to polymer content FIG. 5: TGA of DEGACRYL M449 in a refractory alumina concrete as per Example 16; weight normalized to polymer content FIG. 6: Optical micrograph of a cross section of the fired ceramic from Comparative Example CE 8

FIG. 7: Optical micrograph of a cross section of the fired ceramic from Example 25 (with 30% by weight of Degacryl M546)

Figure 8:
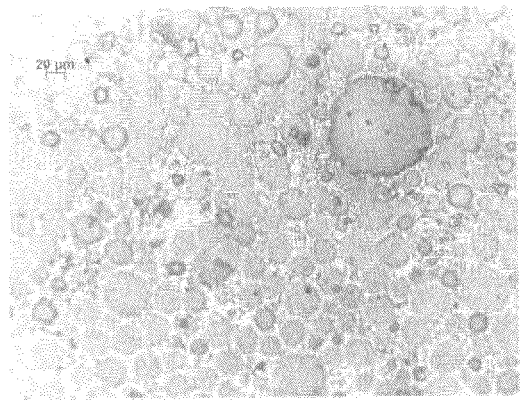

FIG. 8: Optical micrograph of a cross section of the fired ceramic from Example 27 (with 70% by weight of Degacryl M546)

The invention claimed is:

1. A process for producing a ceramic material, the process comprising:
   mixing a ceramic raw composition with from 0.5 to 90% by weight of spherical polymer particles having a diameter of from 5 μm to 3 mm, based on a sum of the ceramic raw composition and the spherical polymer particles, thereby forming a mixed mixture, pressing the mixture to form the ceramic material,
subsequently drying the mixture,
optionally conditioning the mixture,
firing the mixture,
wherein the ceramic raw composition comprises more than 10% by weight of ceramic particles which are larger than 0.6 mm, the process further comprising:
baking the mixture at a temperature of at least 100° C. above a ceiling temperature,
wherein the spherical polymer particles are composed of a polymer having the ceiling temperature of less than 280° C.

2. The process according to claim 1,
wherein the spherical polymer particles have a monomodal particle size distribution.

3. The process according to claim 1,
wherein the polymer is a polymethacrylate, polyoxymethylene or poly-α-methylstyrene and
the spherical polymer particles have a diameter of from 10 µm and 200 µm.

4. The process according to claim 3,
wherein the polymethacrylate has an oxygen content of at least 25% by weight.

5. The process according to claim 4,
wherein the polymer is a polymethacrylate having a methyl methacrylate content of at least 80% by weight.

6. The process according to claim 1,
wherein a proportion of spherical polymer particles added to the ceramic raw composition is from 40 to 70% by weight.

7. The process according to claim 1,
wherein the spherical polymer particles are thermoplastic suspension polymers.

8. The process according to claim 1,
wherein the spherical polymer particles have a particle size distribution from 0.5 to 2.0.

9. The process according to claim 1, wherein at list one of the following stage is performed:
conditioning the mixture.

\* \* \* \* \*